(12) United States Patent
Stöber

(10) Patent No.: US 7,467,568 B2
(45) Date of Patent: Dec. 23, 2008

(54) DRIVE DEVICE COMPRISING A GEAR UNIT AND A MOTOR UNIT

(75) Inventor: Bernd Stöber, Pforzheim (DE)

(73) Assignee: Stöber Antriebstechnik GmbH & Co., Pforzheim (DE)

( * ) Notice: Subject to any disclaimer, the term of this patent is extended or adjusted under 35 U.S.C. 154(b) by 706 days.

(21) Appl. No.: 10/707,495

(22) Filed: Dec. 18, 2003

(65) Prior Publication Data

US 2005/0012410 A1   Jan. 20, 2005

(30) Foreign Application Priority Data

Feb. 15, 2003   (DE) .............................. 203 02 784 U

(51) Int. Cl.
*F16H 1/20* (2006.01)

(52) U.S. Cl. ..................... 74/421 A; 310/16; 310/52; 310/227

(58) Field of Classification Search ............... 74/421 A; 310/16, 52, 227
See application file for complete search history.

(56) References Cited

U.S. PATENT DOCUMENTS

| 5,315,193 | A   | * | 5/1994  | Kummer et al.  | 310/50  |
|-----------|-----|---|---------|----------------|---------|
| 6,543,549 | B1  | * | 4/2003  | Riedl et al.   | 173/216 |
| 6,909,207 | B2  | * | 6/2005  | Ikeda et al.   | 310/47  |
| 2003/0107273 | A1 | * | 6/2003 | Ikeda et al.   | 310/43  |
| 2003/0117030 | A1 | * | 6/2003 | Agnes et al.   | 310/89  |
| 2003/0188520 | A1 | * | 10/2003 | Boulva        | 55/467  |
| 2006/0250044 | A1 | * | 11/2006 | Yokota et al. | 310/261 |

* cited by examiner

*Primary Examiner*—David M Fenstermacher
(74) *Attorney, Agent, or Firm*—Gudrun E. Huckett

(57) ABSTRACT

A drive device has a gear unit having a gear shaft and a motor unit having a motor shaft drivingly connected to the gear shaft. At least one cooling unit is arranged within the drive device for dissipating thermal losses. The cooling unit can be arranged in the gear unit or between the gear unit and the motor unit. For example, the cooling unit has at least one fan that can be arranged in a coupling unit between the gear unit and the motor unit. Instead of or in addition to the fan, a cooling liquid flowing through a flow chamber can be used.

23 Claims, 2 Drawing Sheets

DRIVE DEVICE COMPRISING A GEAR UNIT AND A MOTOR UNIT

BACKGROUND OF INVENTION

1. Field of the Invention

The invention relates to a drive device comprising a gear unit and a motor unit having a motor shaft drivingly connected to the gear shaft.

2. Description of the Related Art

In gear units and geared motors, the thermal loss that occurs during operation is conventionally dissipated to the surroundings via the gear surface by convection. In the case of geared motors, this process is usually assisted by a fan that is arranged at the side of the motor facing away from the gear unit.

It is also known in the case of gears to attach fans on a second shaft that extends from the gear housing, for example, in the case of worm gear pairs on the outwardly projecting worm gear shaft.

SUMMARY OF INVENTION

It is an object of the present invention to configure, the drive device according to the aforementioned kind such that in a constructively simple way an optimal dissipation of the heat produced during operation of the drive device is ensured.

In accordance with the present invention, this is achieved in that at least one cooling unit is arranged within the drive device.

In a drive device according to the invention, a cooling unit ensures that the heat that is produced during operation is optimally removed or dissipated. The heat-exposed parts of the drive device according to the invention are therefore exposed only to minimal thermal stress so that they have a long service life.

Advantageously, the cooling unit is arranged in the gear unit or in the area between the gear unit and the motor unit. In this area, the cooling unit can be arranged such that the cooling efficiency is matched optimally to the respective application.

The cooling unit has preferably at least one fan with which an optimal air flow and thus an optimal venting efficiency is achieved.

According to another embodiment, at least one flow chamber for a cooling medium is provided with which the heat energy can be properly removed or dissipated.

It is also possible to employ at least one fan and at least one flow chamber for a cooling medium in combination. They can be arranged together in the gear unit or in the area between the gear unit and the motor unit. It is also possible to provide the fan in the gear unit and the flow chamber in the area between the gear unit and the motor unit. The reverse arrangement is also possible.

DETAILED DESCRIPTION

Figure 1:
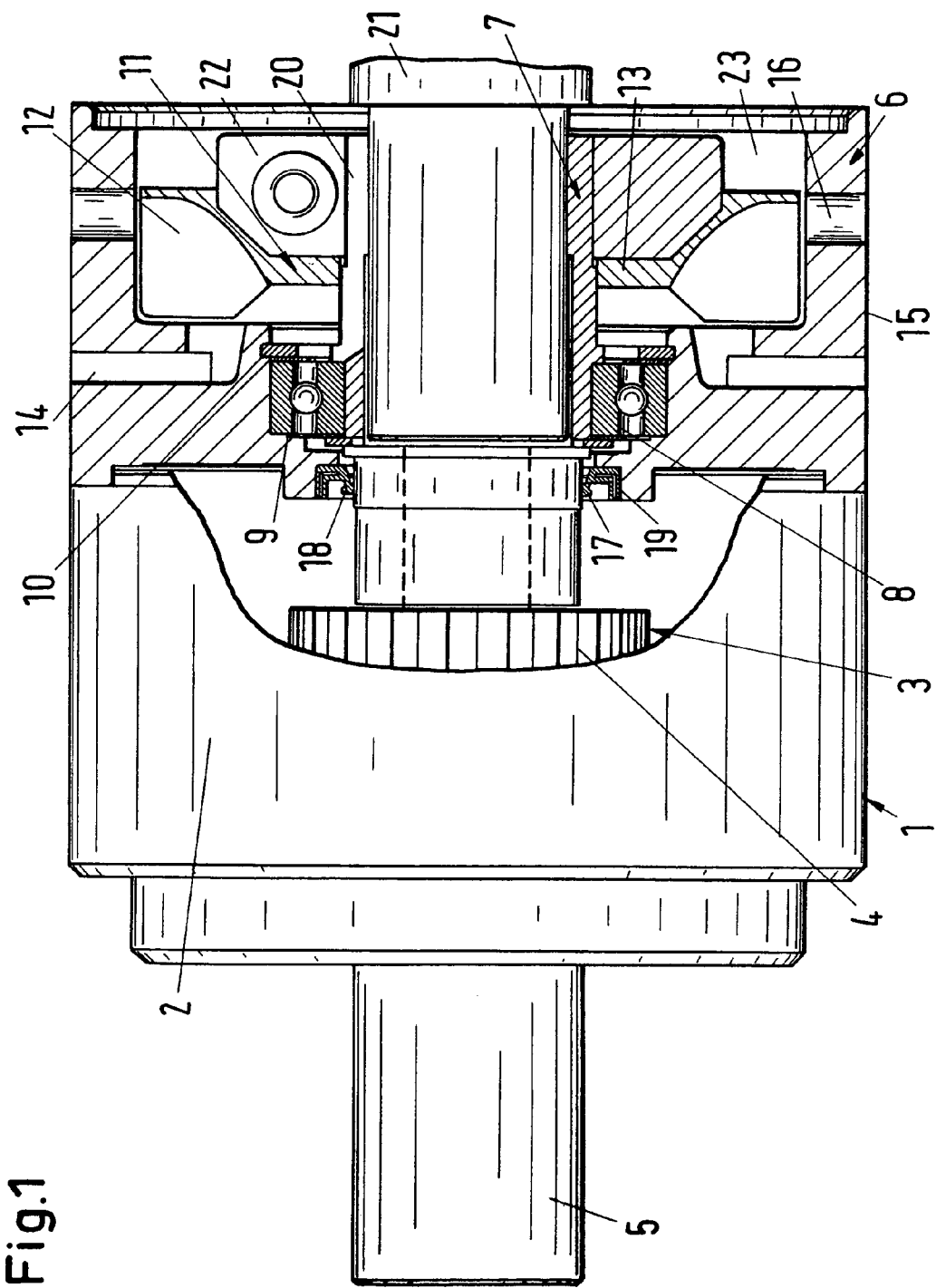
FIG. 1 shows partially in an end view and partially in axial section the drive device according to the invention.

The drive device has a gear unit 1 with a gear housing 2 in which a gear 3 is arranged. In the illustrated embodiment, the gear 3 is a planetary gear having a sun wheel 4 visible in the drawing. The sun wheel 4 engages planet wheels 24 (FIG. 2) that are distributed uniformly about the circumference of the sun wheel 4 within the gear housing 2. Since such gear units 1 are known, they are not explained in detail in this connection. A gear shaft 5 projects from the gear housing 2.

On the end face of the gear housing 2 opposite the gear shaft 5, a coupling housing 6 is attached in which a coupling hub 7 is rotatably supported by means of at least one bearing 8. The bearing 8 is axially secured between a radial shoulder 9 the coupling housing 6 and a securing ring 10. The securing ring surrounds the coupling hub 7 at a spacing. A fan wheel 11 is fixedly secured on the coupling hub 7 and supports, as is known in the art, fan vanes 12. The vanes 12 are provided on the edge of a disk-shaped support 13 that extends radially relative to the coupling hub 7 approximately at half the length of the coupling housing 6. The fan wheel 11 is positioned on the side of the bearing 8 facing away from the gear housing 2. By means of the fan wheel 11, air is taken in through bores 14 that are distributed about the periphery of the coupling housing 6 and open into the peripheral surface 15 of the coupling housing 6. The bores 14 are positioned radially. The air that is sucked in through the bores 14 by means of the fan wheel 11 is forced outwardly through bores 16 that extend also radially and open into the peripheral surface 15 of the coupling housing 6. The bores 14 and 16 are spatially separated from one another so that the sucked-in air is reliably guided by the fan wheel 12 to the bores 16.

The coupling hub 7 projects into the sun wheel 4 in the gear housing 2 and is fixedly connected thereto. At the side of the coupling hub 7 where it exits from the coupling housing 6, a radial shaft seal 17 is provided whose sealing lip 18 rests sealingly against the coupling hub 7. The radial shaft seal 17 is positioned in a receptacle 19 that is open in the direction toward the gear housing 2 at the end face of the coupling housing 6 facing the gear housing 2.

The coupling hub 7 is provided with a longitudinal slot 20 that extends from the end facing the motor axially across a part of the length of the coupling hub 7. In the area of this longitudinal slot 20 the coupling hub 7 can be elastically widened. In this way, a motor shaft 21 can be inserted simply into the coupling hub 7. In the area of the longitudinal slot 20, a clamping ring 22 is seated on the coupling hub 7. After insertion of the motor shaft 21, the coupling hub 7 is tightened by means of the clamping ring 22 so much that a fixed connection results between the coupling hub 7 and the motor shaft 21 for common rotation. The arrangement of the coupling hub 7 with the clamping ring 22 is known and is therefore not explained in more detail.

The fan wheel 11 is positioned in the area between the clamping ring 22 and the bearing 8. In the illustrated embodiment, the fan wheel 11 is formed such that its support 13 and the fan vanes 12 rest against the clamping ring 22 with their side facing away from the gear housing 2.

The fan wheel 11 is positioned in a flow chamber 23 into which the bores 14, 16 open. The cooling air that is sucked in by means of the fan wheel 11 ensures that the thermal loss occurring during operation is optimally dissipated. As a result of the number of intake and exhaust openings (bores) 14, 16 and/or their configuration, the air flow and thus the venting efficiency can be matched to the respective application. The arrangement of the fan wheel 11 between the motor and the gear unit 1 within the coupling housing 6 contributes to an optimal cooling action. It is also possible to arrange within the coupling housing 6, when providing a suitable configuration, more than one fan wheel, if this is required in connection with the use of the drive device.

In the illustrated embodiment, the fan wheel 11 is fastened on the coupling hub 7. It is also possible to attach the fan wheel 11 on the driving motor shaft 21 or the clamping ring 22. In any case, the arrangement of the fan wheel 11 between the gear unit 1 and the motor provides an optimal cooling while providing a simple configuration of the drive device.

The gear housing 1 as well as the housing of the motor are connected detachably to the coupling housing 6 arranged between them. It is therefore possible to remove the motor housing and/or the gear housing in order to access the interior of the coupling housing 6, for example, in order to exchange the fan wheel or to repair it.

The clamping ring 22 can be formed in deviation from the illustrated embodiment also as a monolithic part of the coupling hub.

The coupling can be formed as a plug coupling. In this case, a coupling sleeve is provided for connecting the coupling hubs of the gear shaft 5 and of the motor shaft 21 fixedly to one another. In such a case, the fan wheel 11 is seated fixedly on the coupling sleeve.

Figure 2:
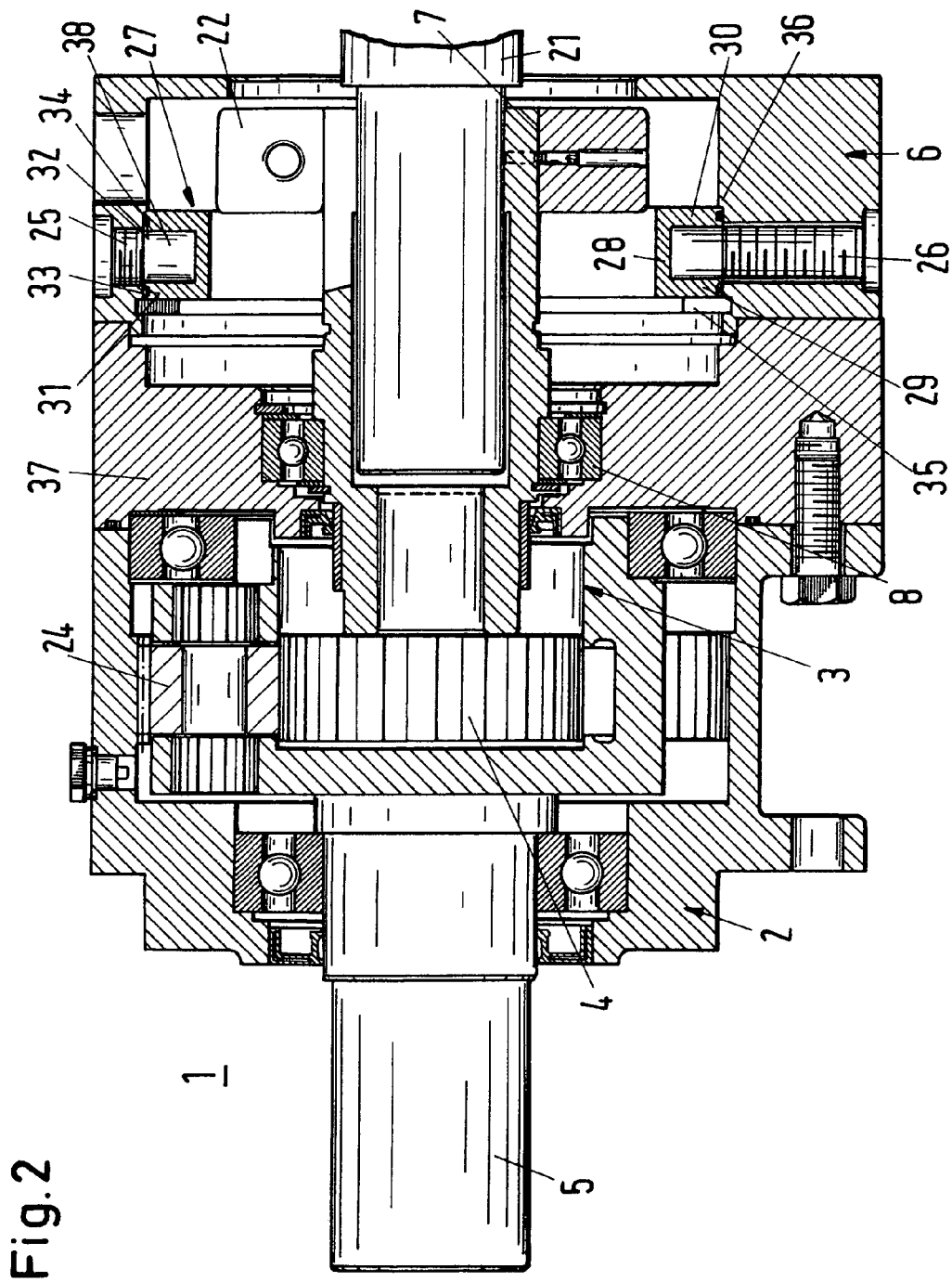
FIG. 2 shows in axial section a second embodiment of the drive device according to the invention.

The embodiment according to FIG. 2 is essentially identical to the preceding embodiment. In the gear housing 2, the gear 3 is arranged which is preferably a planetary gear having a sun wheel 4 and planet wheels 24. The coupling housing 6 is connected in the described way to the gear housing 2 in which the slotted coupling hub 7 is rotatably supported by means of the bearing 8, which is advantageously a ball bearing as shown in the illustrated embodiment. The coupling hub 7 projects into the sun wheel 4 and is fixedly connected thereto. The coupling hub 7 is attached in the described way by means of the clamping ring 22 to the motor shaft 21.

In order to be able to dissipate in an optimal way the thermal loss that occurs during operation of the drive device, two connectors 25 and 26 are provided on the coupling housing 6 to which can be connected conduits illustrated schematically by arrows 25a, 26a in FIG. 2) in order to supply or remove a cooling medium, preferably a cooling liquid. The cooling liquid is expediently water. The cooling medium flows into a flow chamber 38 that surrounds at a radial spacing the motor shaft 21. The connectors 25, 26 via which the cooling medium is supplied and removed open into the flow chamber 38. The flow chamber 38 is delimited by a ring 27 that in cross-section is U-shaped and opens radially outwardly and is closed radially inwardly by a bottom 28. The ring 27 rests sealingly with the end faces of its legs 29, 30 against the inner wall of the coupling housing 6. The end faces of the legs 29, 30 are provided with an annular groove 31, 32, respectively, for receiving an annular seal 33, 34 with which the sealing action is obtained. The ring 27 is secured axially between a securing ring 35 and a radially inwardly oriented shoulder 36 in the inner wall of the coupling housing 6.

The cooling medium circulates continuously in the annular channel 38 during use of the gear unit 1 and takes up the thermal loss that occurs during operation and dissipates it. The two connectors 25, 26 that extend radially outwardly have only a minimal angular spacing from one another so that, for example, via the connector 25 the incoming cooling medium flows almost across the entire circumference of the ring 27 to the connector 26 through which the cooling medium flows to the exterior.

The coupling housing 6 is fastened with intermediate positioning of an intermediate housing 37 to the end face of the gear housing 2. It is possible to configure the intermediate housing 37 as a monolithic part of the gear housing 2.

In the described embodiments, the cooling unit that is comprised of the fan 11 or the ring 27 with the connectors 25, 26 is arranged in the area between the gear unit and the motor unit. Of course, it is also possible to arrange the cooling unit in the gear unit 1.

The two embodiments of cooling units can also be used together in the drive device. For this purpose, the fan 11 as well as the ring 27 with the connectors 25, 26 can be arranged in the gear unit 1 or in the area between the gear unit and the motor unit. It is finally also possible to arrange the fan and the flow chamber separate from one another, for example, to arrange the fan in the gear unit and the flow chamber in the area between the gear unit and the motor unit. The reverse arrangement of fan and flow chamber is possible also.

While specific embodiments of the invention have been shown and described in detail to illustrate the inventive principles, it will be understood that the invention may be embodied otherwise without departing from such principles.

What is claimed is:

1. A drive device comprising:
   gear unit having a gear shaft;
   a motor unit having a motor shaft drivingly connected to the gear shaft; and
   at least one cooling unit arranged within the drive device; and
   a coupling unit arranged between the gear unit and the motor unit and drivingly connecting the gear shaft and the motor shaft;
   wherein the at least one cooling unit is arranged in the coupling unit.

2. The drive device according to clean 1, wherein the cooling unit comprises at least one fan.

3. The drive device according to claim 1, wherein the coupling unit comprises a coupling hub connected fixedly to the gear shaft and the motor shaft.

4. The drive device according to claim 3, wherein the coupling hub is configured to elastically widen over a portion of a length thereof.

5. The drive device according to claim 4, wherein the coupling hub has at least one longitudinal slot.

6. The drive device according to claim 5, further comprising a clamping ring arranged in an area of the longitudinal slot of the coupling hub.

7. The drive device according to claim 6, wherein the clamping ring and the coupling hub together form a monolithic part.

8. The drive device according to claim 6, wherein the clamping ring is a separate part seated on the coupling hub.

9. The drive device according to claim 6, wherein the at least one fan is fixedly mounted on the clamping ring.

10. The drive device according to claim 3, wherein the at least one fan is fixedly mounted on the coupling hub.

11. The drive device according to claim 3, wherein the fan is fixedly mounted on the coupling sleeve.

12. The drive device according to claim 2, wherein the coupling unit has a flow chamber and wherein the fan is positioned in the flow chamber.

13. The drive device according to claim 12, wherein the coupling unit has at least one intake opening and at least one exhaust opening that open into the flow chamber.

14. The drive device according to claim 2, wherein the at least one fan is fixedly mounted on the motor shaft.

15. The drive device according to claim 1, wherein the cooling unit has at least one flow chamber for a cooling medium.

16. The drive device according to claim 15, wherein the flow chamber is provided within a ring.

17. The drive device according to claim 16, wherein the ring is arranged in the coupling unit.

18. The drive device according to claim 16, wherein the ring is arranged in the gear unit.

19. The drive device according to claim 16, wherein the ring has a U-shaped cross-section.

20. The drive device according to claim 16, wherein the ring surrounds the motor shaft at a spacing.

21. The drive device according to claim 15, wherein the cooling unit has at least one inlet conduit and at least one return conduit that open into the flow chamber.

22. The drive device according to claim 1, wherein the coupling unit is a plug coupling.

23. The drive device according to claim 22, wherein the plug coupling has a coupling sleeve connecting a coupling hub of the gear unit and a coupling hub of the motor unit to one another.

\* \* \* \* \*